US008348019B2

(12) United States Patent
Blochle et al.

(10) Patent No.: US 8,348,019 B2
(45) Date of Patent: Jan. 8, 2013

(54) ELEVATOR ELEMENT FOR DRIVING OR REVERSING AN ELEVATOR SUSPENSION MEANS IN AN ELEVATOR SYSTEM

(75) Inventors: Hans Blochle, Hergiswil NW (CH); Ernst Ach, Ebikon (CH)

(73) Assignee: Inventio AG, Hergiswil NW (CH)

( * ) Notice: Subject to any disclaimer, the term of this patent is extended or adjusted under 35 U.S.C. 154(b) by 942 days.

(21) Appl. No.: 12/143,049

(22) Filed: Jun. 20, 2008

(65) Prior Publication Data

US 2009/0001333 A1 Jan. 1, 2009

Related U.S. Application Data

(60) Provisional application No. 60/945,169, filed on Jun. 20, 2007.

(51) Int. Cl.

*B66B 11/08* (2006.01)
*B66D 1/00* (2006.01)
*F16H 27/02* (2006.01)
*F16H 55/36* (2006.01)
*F16H 55/48* (2006.01)

(52) U.S. Cl. ....... 187/254; 187/255; 74/89.22; 254/266; 474/184; 474/190

(58) Field of Classification Search .................. 187/254, 187/255; 74/89.22; 254/266, 334, 390, 393; 474/184, 187, 188, 190; 29/892, 892.3; *F16H 55/36; B66B 15/04, 11/08*
See application file for complete search history.

(56) References Cited

U.S. PATENT DOCUMENTS

| | | | | |
|---|---|---|---|---|
| 6,162,141 | A * | 12/2000 | Rointru et al. | 474/109 |
| 6,371,448 | B1 * | 4/2002 | De Angelis | 254/374 |
| 6,742,769 | B2 * | 6/2004 | Baranda et al. | 254/390 |
| 6,881,166 | B1 * | 4/2005 | Burkhardt et al. | 474/176 |
| 7,958,635 | B2 * | 6/2011 | Yoshida et al. | 29/892.11 |
| 2003/0025109 | A1 * | 2/2003 | Baranda et al. | 254/266 |
| 2003/0192743 | A1 * | 10/2003 | Aulanko et al. | 187/254 |
| 2004/0211497 | A1 * | 10/2004 | Ammon et al. | 148/567 |
| 2005/0090340 | A1 * | 4/2005 | Wang et al. | 474/8 |
| 2007/0062762 | A1 * | 3/2007 | Ach | 187/266 |
| 2008/0105496 | A1 * | 5/2008 | Yuasa et al. | 187/251 |

* cited by examiner

*Primary Examiner* — Michael Mansen
*Assistant Examiner* — Minh Truong
(74) *Attorney, Agent, or Firm* — Fraser Clemens Martin & Miller LLC; William J. Clemens

(57) ABSTRACT

In an elevator element for driving or reversing an elevator suspension device in an elevator system, that interacts with an elevator suspension device, the arithmetic mean of the roughness value of the contact surface measured in the circumferential direction of the elevator element, and the mean roughness value of the contact surface measured in the axial direction of the elevator element, are different. The arithmetic mean roughness value of the contact surface measured in the circumferential direction of the elevator element is less than 1 micrometer.

20 Claims, 1 Drawing Sheet

ELEVATOR ELEMENT FOR DRIVING OR REVERSING AN ELEVATOR SUSPENSION MEANS IN AN ELEVATOR SYSTEM

CROSS-REFERENCE TO RELATED APPLICATION

This application claims the benefit of U.S. provisional patent application Ser. No. 60/945,169 filed Jun. 20, 2007.

FIELD OF THE INVENTION

The present invention relates to an elevator element for driving and/or reversing an elevator suspension means or device in an elevator system and a method for manufacturing such an elevator element. An elevator element according to the present invention has at least one contact surface via which the elevator element interacts with the elevator suspension means for the purpose of transferring a driving force from a drive unit to the elevator suspension means or to reverse such an elevator suspension means within the elevator system. Preferably, such an elevator element is executed in the form of a traction sheave or of a reversing pulley. In the present context, "elevator suspension means" is to be understood as a flexible tension element, for example a rope or a flat-belt type tension element with which at least one elevator car in the elevator system is suspended and moved.

BACKGROUND OF THE INVENTION

It is known to manufacture such elevator elements in such manner that their contact surfaces that interact with the elevator suspension means have an essentially uniform roughness, so that roughness measurements on their contact surfaces in the case of measurements with different directions of scanning direction of the contact element of the roughness measuring instrument yield essentially the same roughness values.

Elevator elements according to the known state of the art have either a relatively high wear on the elevator suspension means as a consequence, if their contact surfaces in the circumferential direction are manufactured with excessively high roughness, or they cause high manufacturing costs, because the higher roughness of the contact surfaces that is allowable in the direction of the elevator element axes cannot be exploited in favor of a less costly manufacture method. Furthermore—in particular when using flat belts as elevator suspension means—an excessively low roughness of the contact surfaces in the axial direction of the elevator elements negatively influences the lateral guidance effect, which has the consequence that the elevator supporting means moves centered over the driving and/or reversing elevator elements.

SUMMARY OF THE INVENTION

The underlying purpose of the present invention is to create an elevator element of the type described above in which with the lowest possible manufacturing outlay an optimization of the wear behavior between elevator element and elevator suspension means can be attained.

According to the present invention, the purpose is fulfilled by means of an elevator element which is manufactured in such manner that the arithmetic mean of the roughness value of its at least one contact surface that is measured in the circumferential direction of the elevator element, and the mean roughness value of its contact surface measured in the axial direction of the elevator element, are different. The advantage of the solution according to the present invention is that—with lower roughness in the circumferential direction for the purpose of minimizing wear—the manufacturing costs of the elevator element relative to an elevator element with equal roughness in both directions can be reduced. Furthermore—in particular when using flat belts as elevator suspension means—an increased roughness of the contact surfaces in the axial direction of the elevator element can positively affect the lateral guidance of the elevator suspension means on the elevator element.

Furthermore, the objective of an elevator element according to the present invention is fulfilled in which the arithmetic mean roughness value of the contact surface measured in the circumferential direction of the elevator element is less than 1 micrometer, preferably 0.1 to 0.8 micrometer, particularly preferably 0.2 to 0.6 micrometer. One of the advantages of contact surfaces with a roughness according to these specifications is the low wear of the elevator suspension means as well as of the contact surfaces of the elevator element itself. A further advantage is that the maximum traction force between the elevator element and the elevator suspension means is relatively exactly limited, which is particularly important in the operating situation in which the elevator suspension means should slip relative to the elevator element during a limited time. Such an operating situation can arise, for example, when as a result of a control fault the elevator car or the counterweight strikes its lower path limits, or when the elevator car or the counterweight is blocked along its travel path for other reasons.

Furthermore, the objective is fulfilled by a method of manufacturing an elevator element in which the contact surface of the elevator element is processed or coated in such manner that the arithmetic mean roughness value of the contact surface measured in the circumferential direction of the elevator element is less than 1 micrometer, preferably 0.1 to 0.8 micrometer, particularly preferably 0.2 to 0.6 micrometer. The processing or coating of an elevator element performed according to this method realizes its advantages as aforesaid.

According to an advantageous embodiment of the present invention, between the arithmetic mean roughness value of the contact surface measured in the circumferential direction of the elevator element, and the mean roughness value of the contact surface measured in the axial direction of the elevator element, a difference of more than 0.2 micrometers is present. This allows lower manufacturing costs to be attained, as well as the lateral guidance of the elevator suspension means on the elevator element to be thereby improved.

According to a further embodiment of the present invention, the arithmetic mean roughness value of the contact surface measured in the axial direction of the elevator element is more than 0.4 micrometer, preferably 0.4 to 0.95 micrometer. This embodiment also serves the purpose of reducing the manufacturing costs of the elevator element and improving the lateral guidance of the elevator suspension means on the elevator element.

According to a further embodiment of the present invention, the at least one contact surface of the elevator element is processed by turning, precision turning, round form grinding. The desired contact surface roughness can thereby be attained with lowest possible manufacturing costs.

According to a further embodiment of the present invention, at least one contact surface of the elevator element has a coating, preferably a chromium-containing coating. The wear-resistance can thereby be improved. Also, the maximum traction force occurring between the elevator element and the elevator suspension means can also be influenced.

According to a further embodiment of the present invention, the elevator element is manufactured from a tempered steel and has at least in the areas of its at least one contact surface a hardness of 15 to 30 HRC. An adequate wear resistance of the elevator element is thus guaranteed.

According to a further embodiment of the present invention, the elevator element forms a monolithic unit with a drive shaft of a drive unit of the elevator system. This has the advantage that elevator elements, which have the function of traction sheaves to drive the elevator suspension means, can be combined without problem with a drive shaft that has approximately the same diameter as the elevator element. Also, through the integration of the elevator elements into the drive shaft, the manufacturing costs can be reduced.

According to a further embodiment of the present invention, the elevator element is embodied so as to interact with at least one elevator suspension means, which has the form of a flat belt or of a poly V belt or of a V belt or a round cross section. On interaction of the elevator element according to the present invention with the sheath of such an elevator suspension means that usually consists of an elastomeric plastic, a defined maximum traction force results, as well as lower wear on the elevator suspension means and on the elevator element.

DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

The U.S. provisional patent application Ser. No. 60/945,169 filed Jun. 20, 2007 is hereby incorporated herein by reference.

The following detailed description and appended drawings describe and illustrate various exemplary embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

Figure 1:
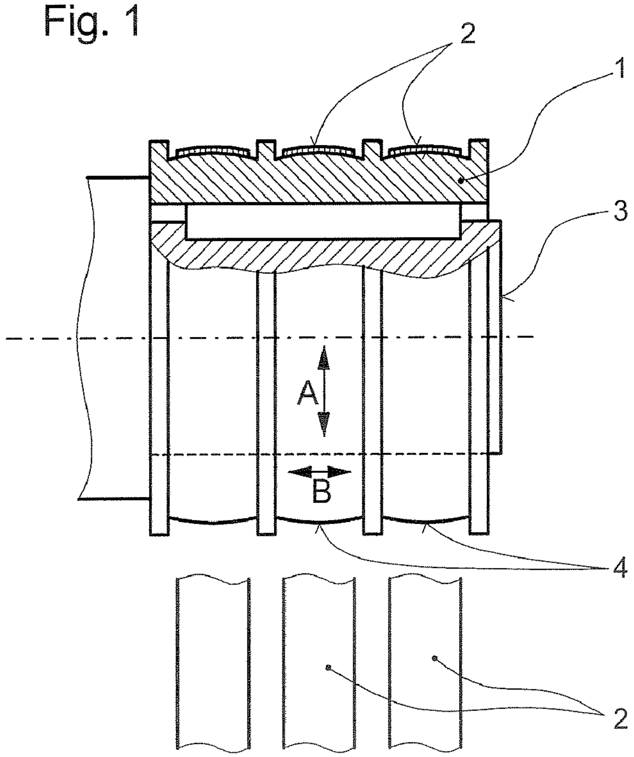
FIG. 1 shows in partial cross section an elevator element according to the present invention in combination with elevator suspension means in the form of flat belts.

FIG. 1 shows an elevator element 1 according to the present invention for driving and/or reversing an elevator suspension means 2 in an elevator system, wherein the elevator element 1 is present in the form of a traction sheave that is fixed on a drive shaft 3 of a drive unit (not shown). This elevator element 1 comprises three contact surfaces 4 which, during elevator operation, interact with three elevator suspension means 2 in the form of flat belts, wherein these elevator suspension means 2 are connected with a (not shown) elevator car and a counterweight of an elevator system, so as to suspend these in an elevator hoistway and drive them. The contact surfaces 4 are executed convex, which serves to guide the elevator suspension means 2 (flat belt) during elevator operation in the middle of the respectively assigned contact surface 4.

Figure 2:
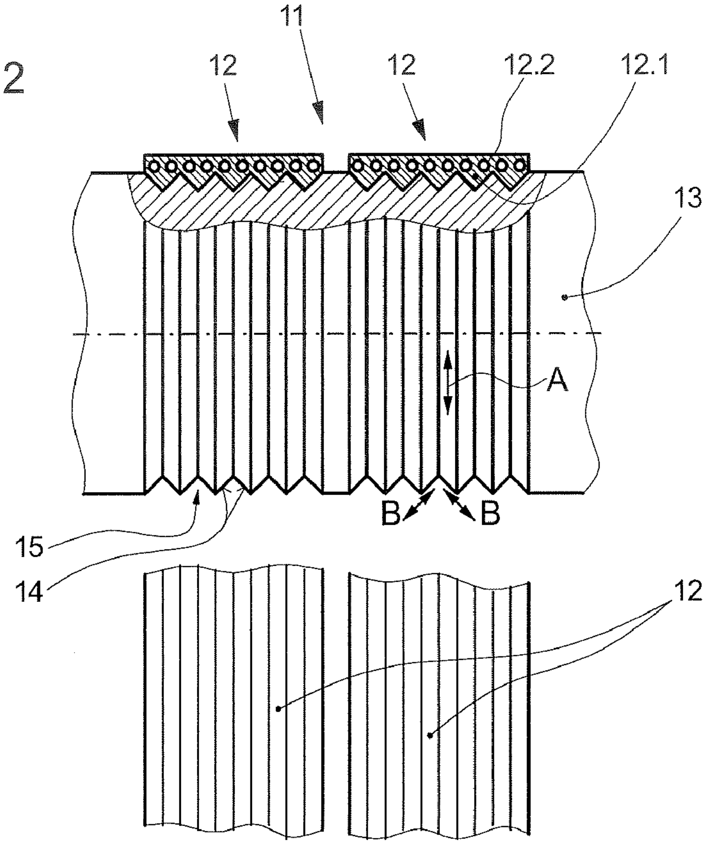
FIG. 2 shows in partial cross section an elevator element according to the present invention with elevator suspension means in the form of poly V belts.

In FIG. 2 is a second exemplary embodiment of an elevator element 11 according to the present invention for driving and/or reversing an elevator suspension means 12 in an elevator system. The elevator element shown in FIG. 2 is integrated in the drive shaft 13 of a drive unit (not shown) and forms with this a monolithic unit. Here, the elevator element 11 interacts with two elevator suspension means 12, which are connected with a (not shown) elevator car and a counterweight of an elevator system, so as to suspend these in an elevator hoistway and drive them. The suspension means 12 that are shown have the form of wire-rope reinforced poly V belts whose poly V profiles engage in corresponding V grooves 15 of the second elevator element 11. The flanks of these V grooves form contact surfaces 14, via which the second elevator element 11 interacts with the second elevator suspension means 12. The elevator suspension means 12 each comprise a belt body 12.1 of a wear-resistant elastomer, in which, to ensure adequate tensile strength, tension bearers 12.2 of steel-wire or synthetic-fiber strands are embedded. The integration of the elevator element 11 shown in FIG. 2 into a drive shaft or reversing shaft 13 allows the use of elevator elements with very low diameters in combination with greatest possible assigned shaft diameters.

Elevator elements according to the present invention, as they are shown for example in FIGS. 1 and 2, are preferably made of steel, in particular of tempered steel, which—at least in the area of the contact surface 4, 14—has a tensile strength of 600-1000 N/mm$^2$ and/or a Rockwell C hardness of at least 15 HRC.

The manufacture of such elevator elements 1, 11, in particular the processing of their contact surfaces 4, 14, takes place expediently by turning, fine turning, or round profile grinding on machine tools that are suitable for the creation of surfaces with low roughness.

According to a further embodiment of the present invention, the contact surfaces 4, 14 of the elevator elements 1, 11 are provided with coatings that have a surface structure with the roughness properties according to the invention and are sufficiently wear resistant. Chromium-containing coatings, in particular hard chromium layers, have proved expedient.

The contact surfaces 4, 14 of the elevator elements 1, 11 are processed or coated in such manner that the arithmetic mean roughness value of the contact surfaces in the circumferential direction of the elevator elements, and the mean roughness value of the contact surfaces measured in the axial direction of the elevator elements, are different. Manufacturing costs are thereby saved through the processing quality of the contact surfaces not having to fulfill the defined maximum requirements for both directions. Furthermore, through an increased roughness of the contact surfaces in the axial direction of the elevator element, the lateral guidance of the elevator supporting means on the elevator element can be improved, in particular if the elevator suspension means is a flat belt or a poly V belt. In FIGS. 1 and 2, the directions of measurement for the roughness measurement in the circumferential direction are referenced with A, and the directions of measurement for the roughness measurement in the axial direction are referenced with B.

To reduce wear on the elevator supporting means—especially long-lasting slip between the elevator elements 1, 11 and the elevator supporting means 2, 12—the contact surfaces 4, 14 are processed or coated in such manner that the arithmetic mean roughness value $R_a$ measured in circumferential direction A of the elevator element 1, 11 is less than 1 micrometer. A further prevention of wear can be attained if the said mean roughness value $R_a$ is between 0.1 and 0.8 micrometers, particularly preferably between 0.2 and 0.6 micrometers. Relatively long-lasting slip of up to 60 seconds duration can occur in an elevator installation if, for example, as a result of a control fault, the elevator car or counterweight strikes its travel path limits or is otherwise blocked.

In connection with the present invention, "mean roughness value" is to be understood as the mean roughness value $R_a$ that is defined in the standard DIN EN ISO 4287.

An advantageous compromise between the call for reduction of wear and the call for low manufacturing costs, or for advantageous lateral guidance properties, is attainable with an embodiment of the elevator elements 1, 11 in which, between the arithmetic mean roughness value $R_a$ of the contact surfaces 4, 14 measured in the circumferential direction of the elevator elements, and the mean roughness value $R_a$ of the contact surface measured in the axial direction of the elevator elements, a difference of more than 0.2 micrometers is present.

Advantageous results in relation to manufacturing costs and lateral guidance properties on interaction with elevator suspension means in the form of flat belts or poly V belts are attainable when the arithmetic mean value $R_a$ of the contact surfaces 4, 14 measured in the axial direction of the elevator element is more than 0.4 micrometers, preferably 0.4 to 0.95 micrometers.

Self-evidently, further embodiments of the elevator elements according to the invention are realizable that, for example, each interact with at least one V belt, round belt, or with at least one round steel-wire rope. The belt-type elevator suspension means preferably comprise belt bodies of an abrasion-resistant elastomer, preferably of polyurethane (PU) or ethylene propylene (diene) monomer (EPM, EPDM), these belt bodies being reinforced in the longitudinal direction by tension bearers of steel-wire or synthetic-fiber strands. In such elevator suspension means, the contact surfaces of the elevator elements interact with elastomeric materials of the elevator suspension means. If steel-wire ropes are used as elevator suspension means, these steel-wire ropes with or without sheath can interact with the elevator elements according to the present invention, the sheaths consisting preferably also of an elastomeric material, for example of polyurethane.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. An elevator element for driving or reversing at least one elevator suspension means in an elevator system, with at least one contact surface that interacts with the elevator suspension means, comprising:

the contact surface is formed with a surface structure having an arithmetic mean of a roughness value in a circumferential direction of the elevator element that is different than an arithmetic mean of a roughness value in an axial direction of the elevator element, wherein the arithmetic mean of the roughness value of the contact surface measured in the circumferential direction of the elevator element is less than 1 micrometer, and the arithmetic mean roughness value of the contact surface measured in the axial direction of the elevator element is in a range of 0.4 to 0.95 micrometer.

2. The elevator element according to claim 1 wherein the arithmetic mean of the roughness value of the contact surface measured in the circumferential direction of the elevator element is in a range of 0.1 to 0.8 micrometer.

3. The elevator element according to claim 1 wherein the arithmetic mean of the roughness value of the contact surface measured in the circumferential direction of the elevator element is in a range of 0.2 to 0.6 micrometer.

4. The elevator element according to claim 1 wherein between the arithmetic mean roughness value of the contact surface in the circumferential direction of the elevator element and the arithmetic mean roughness value of the contact surface in the axial direction of the elevator element, there is a difference of more than 0.2 micrometer.

5. The elevator element according to claim 1 wherein the contact surface is processed by one of turning, fine turning and round form grinding.

6. The elevator element according to claim 1 wherein the contact surface has a coating.

7. The elevator element according to claim 6 wherein the contact surface coating is a chromium-containing coating.

8. The elevator element according to claim 1 wherein the elevator element is manufactured from a tempered steel and in an area of the contact surface has a hardness in a range of 15 to 30 HRC.

9. The elevator element according to claim 1 wherein the elevator element forms a monolithic unit with a drive shaft of a drive unit.

10. The elevator element according to claim 1 wherein the elevator element is formed to interact with at least one elevator suspension means which has the form of one of a flat belt, a poly V belt, a V belt or a round cross section.

11. A method for manufacturing an elevator element for driving or reversing an elevator suspension means in an elevator system, comprising the steps of:

a. providing the elevator element with at least one contact surface that interacts with the elevator suspension means; and b. processing or coating the at least one contact surface to produce an arithmetic mean of the roughness value of the contact surface measured in a circumferential direction of the elevator element that is less than 1 micrometer and that is different than an arithmetic mean of a roughness value measured in an axial direction of the elevator element, wherein the arithmetic mean roughness value of the contact surface measured in the axial direction of the elevator element is in a range of 0.4 to 0.95 micrometer.

12. The method according to claim 11 wherein the arithmetic mean of the roughness value of the contact surface measured in the circumferential direction of the elevator element is in a range of 0.1 to 0.8 micrometer.

13. The method according to claim 11 wherein the arithmetic mean of the roughness value of the contact surface measured in the circumferential direction of the elevator element is in a range of 0.2 to 0.6 micrometer.

14. An elevator suspension means and an elevator element for driving or deflecting the elevator suspension means in an elevator installation, the elevator element comprising:

at least one contact surface that co-operates with the elevator suspension means, wherein an arithmetic average roughness of the contact surface, as measured in a circumferential direction of the elevator element, is 0.1 to 0.8 micrometer.

15. The elevator suspension means and the elevator element according to claim 14, wherein the arithmetic average roughness of the contact surface, as measured in the circumferential direction of the elevator element, and an arithmetic average roughness of the contact surface, as measured in an axial direction of the elevator element, are different.

16. The elevator suspension means and the elevator element according to claim 15, wherein a difference of more than 0.2 micrometer is present between the arithmetic average roughness of the contact surface, as measured in the circumferential direction of the elevator element, and the arithmetic average roughness of the contact surface, as measured in the axial direction of the elevator element.

17. The elevator suspension means and the elevator element according to claim 16, wherein the arithmetic average roughness of the contact surface, as measured in the axial direction of the elevator element, is more than 0.4 micrometer.

18. The elevator suspension means and the elevator element according to claim 14, wherein the contact surface is processed by one of turning and precision turning.

19. The elevator suspension means and the elevator element according to claim 14, wherein the contact surface has a coating containing chromium, and the elevator element is made from a tempering steel and has a hardness of 15 to 30 HRC at the contact surface.

20. The elevator suspension means and the elevator element according to claim 14, wherein the elevator element forms an integral unit with a drive shaft of a drive unit, and the elevator element is constructed for co-operation with at least one elevator suspension means that has the form of one of a flat belt, a wedge-ribbed belt, a V-belt, and a belt with a round cross-section.

* * * * *